United States Patent
Choi et al.

(10) Patent No.: US 9,964,631 B2
(45) Date of Patent: May 8, 2018

(54) RADAR APPARATUS AND ANTENNA APPARATUS

(71) Applicant: MANDO CORPORATION, Pyeongtaek-si, Gyeonggi-do (KR)

(72) Inventors: Seung Un Choi, Suwon-si (KR); Seong Hee Jeong, Yongin-si (KR)

(73) Assignee: MANDO CORPORATION, Pyeongtaek-si, Gyeonggi-Do (KR)

(*) Notice: Subject to any disclaimer, the term of this patent is extended or adjusted under 35 U.S.C. 154(b) by 589 days.

(21) Appl. No.: 14/292,202

(22) Filed: May 30, 2014

(65) Prior Publication Data

US 2015/0229033 A1    Aug. 13, 2015

(30) Foreign Application Priority Data

Jun. 3, 2013  (KR) .................. 10-2013-0063531

(51) Int. Cl.
*H01Q 21/08* (2006.01)
*G01S 7/03* (2006.01)
(Continued)

(52) U.S. Cl.
CPC ............. *G01S 7/032* (2013.01); *G01S 7/03* (2013.01); *G01S 7/2813* (2013.01); *G01S 13/42* (2013.01);
(Continued)

(58) Field of Classification Search
CPC .... H01Q 21/08; H01Q 3/2611; H01Q 3/2635; G01S 7/032; G01S 7/2813; G01S 7/03; G01S 13/42; G01S 13/58
See application file for complete search history.

(56) References Cited

U.S. PATENT DOCUMENTS 6,288,672 B1 *  9/2001  Asano ................ G01S 7/35
                                                     342/368
6,380,884 B1 *  4/2002  Satou ................ G01S 13/42
                                                     342/147
(Continued)

FOREIGN PATENT DOCUMENTS

EP   0 987 561 A2   3/2000
JP   2000-155171 A   6/2000
JP   2010-071865 A   4/2010

OTHER PUBLICATIONS

C. Ren, W. Xiao-Mo and X. Zheng-Hui, "Research on grating lobe suppression based on the virtual array transformation algorithm," ISAPE2012, Xian, 2012, pp. 206-209. doi: 10.1109/ISAPE.2012.6408745.*

(Continued)

*Primary Examiner* — Matthew M Barker
(74) *Attorney, Agent, or Firm* — McDermott Will & Emery LLP

(57) ABSTRACT

A radar apparatus includes: a transmission unit including a plurality of transmission antennas which are arranged at a predetermined transmission antenna interval, and configured to radiate a transmission signal using the plurality of transmission antennas; a reception unit including a plurality of reception antennas which are arranged at a predetermined reception antenna interval, and configured to receive a reception signal when the transmission signal is reflected by an object, through the plurality of reception antennas; and a signal processing unit configured to detect the object based on the reception signal received by the reception unit.

5 Claims, 8 Drawing Sheets

(51) Int. Cl.
   *G01S 13/42*   (2006.01)
   *H01Q 3/26*   (2006.01)
   *G01S 7/28*   (2006.01)
   *G01S 13/58*   (2006.01)

(52) U.S. Cl.
   CPC ......... *H01Q 3/2611* (2013.01); *H01Q 3/2635* (2013.01); *H01Q 21/08* (2013.01); *G01S 13/58* (2013.01)

(56) References Cited

U.S. PATENT DOCUMENTS

| | | | | |
|---|---|---|---|---|
| 7,545,310 B2* | 6/2009 | Matsuoka | ............. | G01S 13/426 |
| | | | | 342/70 |
| 7,548,185 B2* | 6/2009 | Sheen | ................... | G01S 13/89 |
| | | | | 342/22 |
| 8,009,083 B2* | 8/2011 | Shirakawa | ................ | G01S 3/74 |
| | | | | 342/118 |
| 8,264,399 B2* | 9/2012 | Shinomiya | ............... | G01S 3/74 |
| | | | | 342/175 |
| 8,289,203 B2* | 10/2012 | Culkin | ................. | H01Q 21/061 |
| | | | | 342/117 |
| 8,742,980 B2* | 6/2014 | Shirakawa | ............. | G01S 13/90 |
| | | | | 342/165 |
| 2004/0104844 A1* | 6/2004 | Rooyen | ................. | H01Q 1/246 |
| | | | | 342/377 |
| 2005/0195103 A1* | 9/2005 | Davis | .................... | H01Q 21/22 |
| | | | | 342/99 |
| 2008/0100510 A1* | 5/2008 | Bonthron | ............... | H01Q 21/29 |
| | | | | 342/373 |
| 2010/0075618 A1 | 3/2010 | Isaji | | |
| 2012/0274499 A1* | 11/2012 | Chang | ...................... | G01S 7/42 |
| | | | | 342/107 |
| 2012/0299773 A1* | 11/2012 | Stirling-Gallacher | .. | G01S 13/89 |
| | | | | 342/368 |
| 2015/0325913 A1* | 11/2015 | Vagman | ............... | H01Q 3/2605 |
| | | | | 342/368 |

OTHER PUBLICATIONS

Chinese Office Action issued in corresponding Chinese Patent Application No. 201410241757.X, dated Mar. 2, 2016.

* cited by examiner

FIG. 4
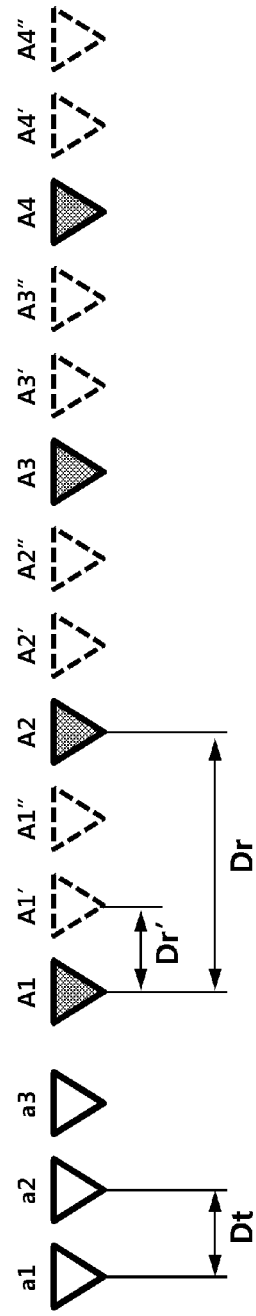
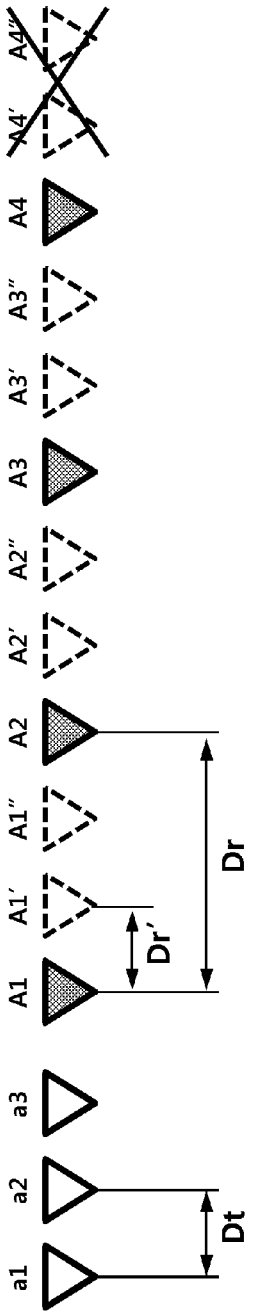

RADAR APPARATUS AND ANTENNA APPARATUS

CROSS-REFERENCE TO RELATED APPLICATION

This application claims priority from and the benefit under 35 U.S.C. § 119(a) of Korean Patent Application No. 10-2013-0063531, filed on Jun. 3, 2013, which is hereby incorporated by reference for all purposes as if fully set forth herein.

BACKGROUND OF THE INVENTION

1. Field of the Invention

The present invention relates to a radar apparatus and an antenna apparatus.

2. Description of the Prior Art

A radar apparatus in the related art uses an antenna structure that increases an antenna interval in at a reception end in order to enhance precision of sensing an object, i.e. resolution.

However, although such an antenna structure may enhance resolution, there is a problem in that a grating lobe occurrence position becomes nearer to a position of a main beam, i.e. a central position since the antenna interval at the reception end is increased.

SUMMARY OF THE INVENTION

In this background, an aspect of the present invention is to provide a radar apparatus and an antenna apparatus including an antenna structure capable of suppressing a grating lobe while enhancing resolution.

In accordance with an aspect of the present invention, there is provided a radar apparatus including: a transmission unit including a plurality of transmission antennas which are arranged at a predetermined transmission antenna interval, and configured to radiate a transmission signal using the plurality of transmission antennas; a reception unit including a plurality of reception antennas which are arranged at a predetermined reception antenna interval, and configured to receive a reception signal when the transmission signal is reflected by an object, through the plurality of reception antennas; and a signal processing unit configured to detect the object based on the reception signal received by the reception unit.

According to another aspect of the present invention, there is provided an antenna apparatus for signal transmission/reception, including: a transmission antenna unit including a plurality of transmission antennas arranged at a predetermined transmission antenna interval; and a reception antenna unit including a plurality of reception antennas arranged at a reception antenna interval which is determined on the transmission antenna interval.

As described above, according to the present invention, it is possible to provide a radar apparatus and an antenna apparatus including an antenna structure capable of suppressing a grating lobe while enhancing resolution.

BRIEF DESCRIPTION OF THE DRAWINGS

The above and other objects, features and advantages of the present invention will be more apparent from the following detailed description taken in conjunction with the accompanying drawings, in which:

FIGS. 4a and 4b are views illustrating, as another exemplary antenna structure, an antenna structure having a virtual aperture in a case where there are three transmission antennas and four reception antennas;

DETAILED DESCRIPTION OF THE EXEMPLARY EMBODIMENTS

The present invention relates to a radar apparatus and an antenna apparatus which has an antenna structure capable of suppressing a grating lobe while enhancing resolution.

An antenna structure exemplified in the present invention has an antenna arrangement structure in which an aperture is expanded so as to suppress a grating lobe while enhancing resolution and may further include an antenna arrangement structure which is formed with a virtual receiving antenna and the formation position is adjusted.

Hereinafter, an antenna structure disclosed herein will be described in more detail with reference to illustrative drawings. Further, a radar apparatus and an antenna apparatus which use the antenna structure will also be described in more detail with reference to the illustrative drawings.

Figure 1:
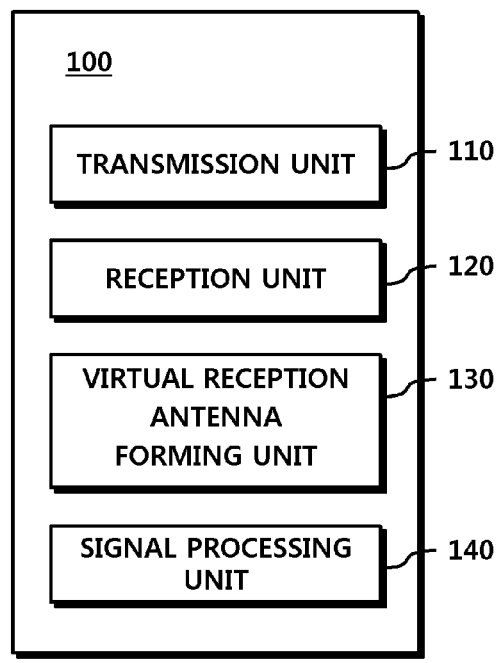
FIG. 1 is a block diagram illustrating a radar apparatus 100 according to an exemplary embodiment of the present invention.

FIG. 1 is a block diagram illustrating a radar apparatus 100 according to an exemplary embodiment of the present invention.

Referring to FIG. 1, the radar apparatus 100 according to an exemplary embodiment of the present invention includes: a transmission unit 110 including a plurality of transmission antennas which are arranged at a predetermined transmission antenna interval, and configured to radiate a transmission signal using the plurality of transmission antennas; a reception unit 120 including a plurality of reception antennas which are arranged at a predetermined reception antenna interval, and configured to receive a reception signal, which corresponds the transmission signal reflected by an object, through the plurality of reception antennas; and a signal processing unit 140 configured to detect a distance to the object, a velocity of the object, a bearing of the object based on the reception signal received by the reception unit 120.

As described above, the radar apparatus 100 is provided with a plurality of antennas for signal transmission/reception. The antennas provided in the radar apparatus 100 include a plurality of transmission antennas at a transmission end for signal transmission and a plurality of reception antennas at a reception end for signal reception. Antenna structures of the antennas provided in the radar apparatus 100 (e.g., an interval between antennas and the number of antennas) will be described in more detail.

Figure 2:
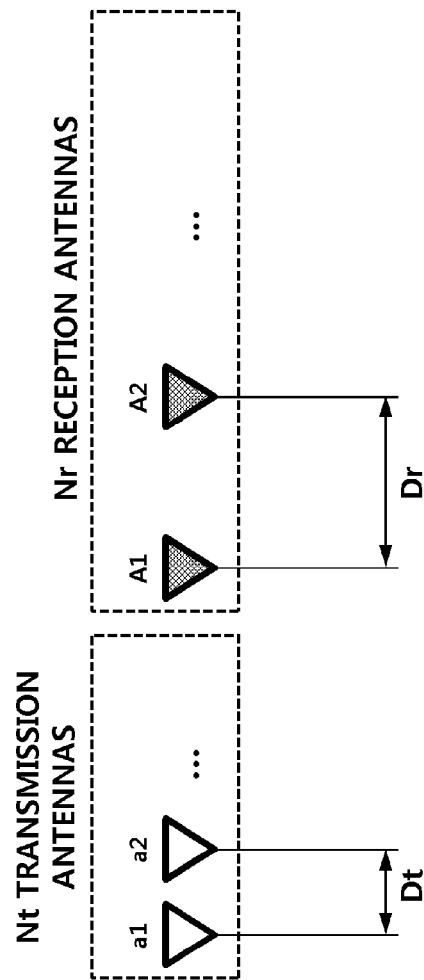
FIG. 2 is a view schematically illustrating a generalized antenna structure in the radar apparatus 100 according to the exemplary embodiment of the present invention.
Figure 3:
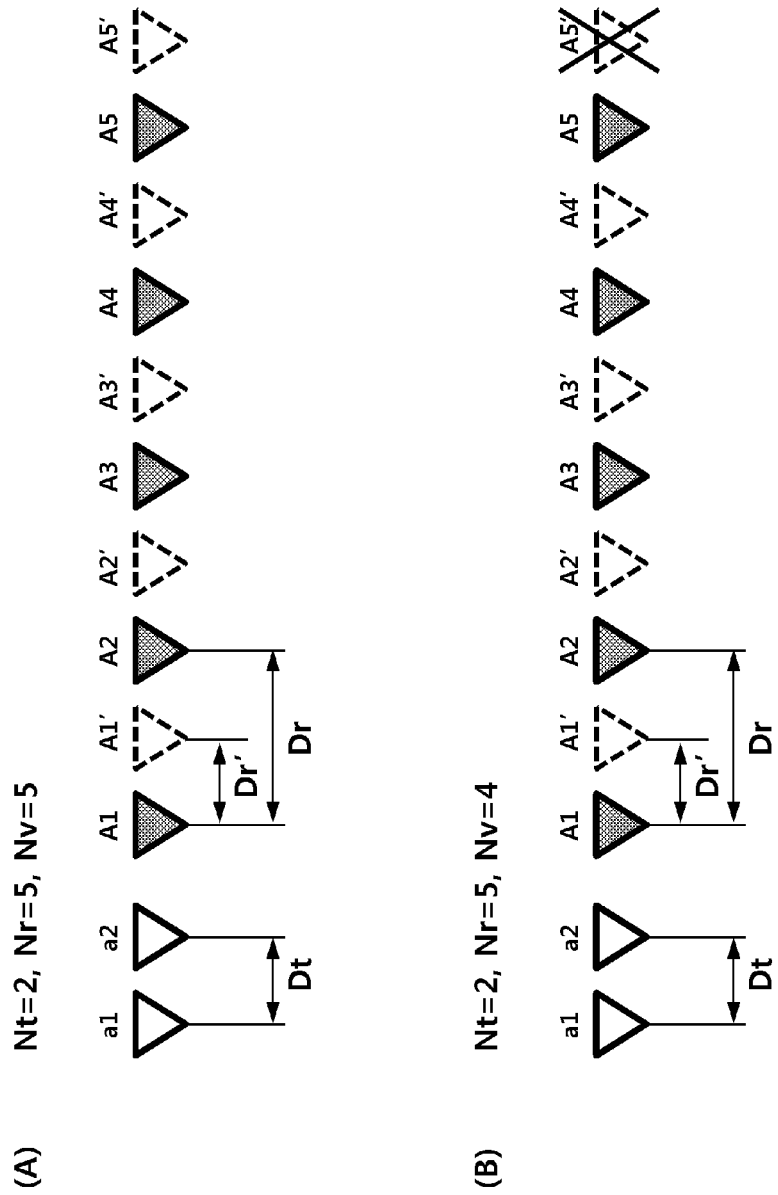
FIGS. 3a and 3b are views schematically illustrating an antenna structure having a virtual aperture in a case where there are two transmission antennas and five antennas, as an example of an antenna structure.

FIG. 2 is a view schematically illustrating a generalized antenna structure in the radar apparatus 100 according to the exemplary embodiment of the present invention.

Referring to FIG. 2, the radar apparatus 100 includes a predetermined number of transmission antennas a1, a2, (the number of transmission antennas) and a predetermined number of reception antennas A1, A2, . . . (the number of reception antennas).

The antenna structure will be described with reference to FIG. 2. The plurality of transmission antennas a1, a2, . . . are arranged at a predetermined interval (transmission antenna interval), and the plurality of reception antennas A1, A2, . . . are also arranged at a predetermined interval (reception antenna interval).

In connection with the antenna intervals, the reception antenna interval may be determined depending on the transmission antenna interval.

In addition, the reception antenna interval may be determined based on, for example, the number of transmission antennas and the transmission antenna interval. As a more specific example, the reception antenna interval may have a value determined by multiplying the number of transmission antennas and the transmission antenna interval as Equation 1 as follows.

$$Dr = Nt \times Dt \qquad \text{Equation 1}$$

In Equation 1, Dr refers to the reception antenna interval, Nt refers to the number of transmission antennas, and Dt refers to the transmission antenna interval.

In another example, the reception antenna interval may not satisfy Equation 1. In such a case, the reception antenna interval may be an interval between two neighboring reception antennas which are spaced apart (shifted) by the transmission antenna interval with reference to arrangement positions where the reception antennas are initially arranged. An antenna arrangement structure corresponding to this case is exemplified in FIG. 7.

Meanwhile, the radar apparatus 100 according to the exemplary embodiment of the present invention performs an object detection function that detects the distance to an object, the velocity of the object, and the bearing of the object based on the reception signal received through the plurality of reception antennas. At this time, in order to enhance the accuracy of object detection (i.e., in order to enhance resolution), the radar apparatus 100 has an antenna structure of an "expanded aperture structure" that increases the reception antenna interval. In the present specification, the resolution is also referred to as discrimination (resolving power) which indicates the performance of precisely discriminating two adjacent objects. This is one of very important performance factors of the radar apparatus 100.

When the antenna structure of the expanded aperture structure is provided as described, a position where a grating lobe occurs on the reception end is close to a central position where a main beam is positioned. Accordingly, the radar apparatus 100 according to the exemplary embodiment of the present exemplary embodiment may further include an antenna structure having a "virtual aperture structure" such that the position where the grating lobe occurs may be positioned further away from the central position where the main beam is positioned, that is, the grating lobe may be suppressed.

In order to further include the virtual aperture structure as described above, as illustrated in FIG. 1, the radar apparatus 100 according to the exemplary embodiment of the present invention may further include a virtual reception antenna forming unit 130 which performs a control such that a plurality of virtual reception antennas may be formed.

The virtual reception antenna forming unit 130 performs a signal processing to generate a signal having a predetermined phase difference which may be determined according to a reception antenna interval Dr' with reference to a signal received by a real reception antenna.

That is, the virtual reception antenna forming unit 130 performs a signal processing to generate a virtual signal (a signal having a phase difference with reference to an actually received signal) as if a signal is received through a virtual reception antenna virtually arranged at a position where no real reception antenna is disposed. Herein, "virtual reception antenna is formed" may have the same meaning as "a reception signal which is not actually received is generated." In this context, an arrangement structure of virtual reception antennas (e.g., the antenna interval and the number of antennas) may have the same meaning as a structure that generates a reception signal which is not actually received (e.g., the antenna interval and the number of antennas).

Due to the virtual reception antenna forming unit 130, the reception end may have a reception end antenna structure in which not only a plurality of reception antennas exists, but also a plurality of virtual reception antennas virtually exists.

The antenna structure in which a plurality of virtual reception antennas exists on the reception end is referred to as an "antenna structure having a virtual aperture". The antenna structure having a virtual aperture will be described in more detail with reference to FIGS. 3 to 6.

FIGS. 3a and 3b schematically illustrate an antenna structure having a virtual aperture in a case where there are two transmission antennas and five reception antennas, as an example of an antenna structure.

Referring to FIGS. 3a and 3b, when performing a control such that the plurality of virtual reception antennas is formed according to the arrangement structures of the plurality of transmission antennas and the plurality of reception antennas, the virtual reception antenna forming unit 130 performs a control such that the plurality of virtual reception antennas is formed to be dispersed in such a manner that one virtual reception antenna is formed in each space between two adjacent reception antennas.

As an example of a virtual reception antenna arrangement method, in performing a control such that the plurality of virtual reception antennas is formed to be dispersed in such a manner that one virtual reception antenna is formed in each space between two adjacent reception antennas, as illustrated in FIGS. 3a and 3b, the virtual reception antenna forming unit 130 may perform a control such that a plurality of virtual reception antennas A1', A2', A3', A4', and A5' are formed and disposed to be spaced apart from each other by the reception antenna interval Dr starting from a position (in FIGS. 3a and 3b, the position A1') which is shifted, by a transmission antenna interval Dt, with reference to a position of a reception antenna A1 which is initially arranged with reference to a specific point among a plurality of reception antennas A1, A2, A3, A4, and A5.

When the plurality of virtual reception antennas is arranged as described above, an arrangement as illustrated in FIG. 3a may be obtained.

Meanwhile, in order to maintain or reduce an antenna aperture size, a virtual reception antenna which is virtually formed outside the outermost real reception antenna A5 may not be used as illustrated in FIG. 3b.

Hereinbelow, the antenna structure will be described in more detail with reference to each of FIGS. 3a and 3b. Referring to FIG. 3a, the virtual reception antenna forming unit 130 may perform a control such that a plurality of virtual reception antennas A1', A2', A3', A4', and A5' may be virtually formed in the reception end according to an arrangement structure of a plurality of transmission antenna a1 and a2 on the transmission end and a plurality of reception antennas A1, A2, A3, A4, and A5 on the reception end.

In addition, as illustrated in FIG. 3a, the virtual reception antenna forming unit 130 may perform a control in such a manner that a plurality of virtual reception antennas A1', A2', A3', A4', and A5' are virtually formed to dispersed in the spaces of a plurality of real reception antennas A1, A2, A3, A4, and A5, respectively, although the plurality of real reception antennas A1, A2, A3, A4, and A5 may be arranged and then, the plurality of virtual reception antennas A1', A2', A3', A4', and A5' may be arranged, that is, in the order of A1, A2, A3, A4, A5, A1', A2', A3', A4', and A5'.

As an example, in performing a control such that the virtual reception antennas A1', A2', A3', A4', and A5' may be virtually formed to be dispersed in the spaces of the reception antennas, respectively, the virtual reception antenna forming unit 130 may perform a control such that the virtual reception antennas may be formed to be dispersed in such a manner that the same number of virtual reception antennas may be disposed in each space between every two adjacent real reception antennas.

Referring to the example illustrated in FIG. 3a, a virtual reception antenna A1' may be virtually formed between real reception antennas A1 and A2, a virtual reception antenna A2' may be virtually formed between real reception antennas A2 and A3, a virtual reception antenna A3' may be virtually formed between real reception antenna A3 and A4, a virtual reception antenna A4' may be virtually formed between real reception antenna A4 and A5, and a virtual reception antenna A5' may be virtually formed outside a real reception antenna A5.

That is, in the antenna structure exemplified in FIG. 3a, one virtual reception antenna is equally formed in each space between two adjacent reception antennas. As a result, the antennas are arranged in the order of A1, A1', A2, A2', A3, A3', A4, A4', A5, and A5' on the reception end.

When the number of transmission antennas and the number of reception antennas are determined, the reception antenna interval of the real reception antennas may be determined based on, for example, the number of transmission antennas and the transmission antenna interval. More specifically, a reception antenna interval may have a value obtained by multiplying the number of transmission antennas and a transmission antenna interval as in Equation 2 as follows.

$$Dr = Nt \times Dt \qquad \text{Equation 2}$$

In Equation 2, Dr refers to a reception antenna interval, Nt refers to the number of transmission antennas, and Dt refers to a transmission antenna interval.

In another example of determining a reception antenna interval, the reception antenna interval may not satisfy Equation 2. In such a case, the reception antenna interval may be an interval which allows a position, which is spaced apart (shifted) by a transmission antenna interval with reference to the arrangement position of the initially arranged reception antenna, to exist between two adjacent reception antenna. An antenna arrangement structure corresponding to this is exemplified in FIG. 7.

In the antenna structure exemplified in FIG. 3a, when calculating the reception antenna interval Dr using equation 2, the reception antenna interval Dr equals to 2×Dt. In the antenna structure exemplified in FIG. 3b, the reception antenna interval Dr also equals to 2×Dt. That is, the five reception antennas A1, A2, A3, A4, and A5 are disposed to be spaced apart from each other at an interval (transmission antenna interval Dt) which corresponds to two times the interval between the two transmission antennas a1 and a2.

In addition, the virtual reception antenna forming unit 130 may determine an interval (i.e., a reception end antenna interval) of reception end antennas A1, A1', A2, A2', A3, A3', A4, A4', A5, and A5' which includes a plurality of reception antenna A1, A2, A3, A4, and A5 and a plurality of virtual reception antennas A1', A2', A3', A4', and A5' based on the number of transmission antennas and the reception antenna interval, and the virtual reception antenna forming unit 130 may perform a control such that a plurality of virtual reception antennas are formed to be dispersed in the spaces of the reception antennas, respectively, according to the reception end antenna interval determined as described above.

The above-described reception end antenna interval may be the same as, for example, the transmission antenna interval as Equation 3 as follows.

$$Dr' = Dr/Nt \qquad \text{Equation 3}$$

In Equation 3, Dr' refers to a reception end antenna interval, Dr refers to a reception antenna interval, and Nt refers to the number of transmission antennas.

Meanwhile, in order to determine, for example, the number of virtual reception antennas, the virtual reception antenna forming unit 130 may determine the number of virtual reception antennas based on, for example, the number of transmission antennas and the number of reception antennas.

More specifically, the virtual reception antenna forming unit 130 may determine the number of virtual reception antennas by multiplying a value obtained by taking 1 from the number of transmission antennas and the number of reception antennas.

$$Nv = (Nt - 1) \times Nr \qquad \text{Equation 4}$$

In Equation 4, Nv refers to the number of virtual reception antennas, Nt refers to the number of transmission antennas, and Nr is the number of reception antennas.

When such a method of determining the number of virtual reception antennas is applied to the antenna structure exemplified in FIG. 3a, since Nt=2 and Nr=5 in the antenna structure of FIG. 3a, Nv=(2−1)×5=5. That is, in FIG. 3a, the five virtual reception antennas including A1', A2', A3', A4', and A5' are used in a signal processing process.

In the antenna structure of FIG. 3a, at the time of signal processing, the signal processing unit 140 applies a signal (reception signal), which is returned and received when a transmission signal transmitted from the transmission antenna a1 is reflected by an object, to the signal processing as being received through the five real reception antennas A1, A2, A3, A4, and A5, and applies a signal (reception signal), which is returned and received when a transmission signal transmitted from the transmission antenna a2 is reflected by the object, to the signal processing as being received by the five virtually existing virtual reception antennas A1', A2', A3', A4', and A5'. As will be described again below, signal processing means a phase difference compensation processing that compensates for a phase difference between all of the antennas (including all of the real reception antennas and the virtually formed reception antennas), and a signal synthesizing processing that synthesizes the signals of which the phase difference has been compensated for.

Meanwhile, the radar apparatus 100 according to an exemplary embodiment of the present invention may not use the virtual reception antenna virtually formed outside the outermost real reception antenna in order to maintain or reduce the antenna aperture size. That is, after a plurality of virtual reception antennas is virtually formed, among the plurality of virtual reception antennas, the virtual reception antenna virtually formed outside the outermost real reception antenna may not be used during signal processing.

In another point of view, the radar apparatus 100 according to an exemplary embodiment of the present invention may set a limit such that in the process of forming a plurality of virtual reception antennas, no virtual reception antenna is formed outside the outermost real reception antenna so as to maintain or reduce the antenna aperture size.

FIG. 3b exemplifies the antenna structure in which no virtual reception antenna is formed outside the outermost real reception antenna as described above.

Referring to FIG. 3b, a virtual reception antenna A5' may not be virtually formed outside the outermost reception antenna A5 or may not be used even after it is formed, unlike that illustrated in FIG. 3a.

When the antenna structure in which no virtual reception antenna is formed outside the outermost reception antenna, the virtual reception antenna forming unit 130 may determine the number of virtual reception antennas by multiplying a value obtained by taking 1 from the number of transmission antennas and a value obtained by taking 1 from the number of the reception antenna.

As another example of a method of determining the above-described number of virtual reception antennas, the number of virtual reception antennas may be calculated using Equation 5 as follows.

$$Nv=(Nt-1)\times(Nr-1) \quad \text{Equation 5}$$

In Equation 5, Nv refers to the number of virtual reception antennas, Nt refers to the number of transmission antennas, and Nr refers to the number of reception antennas.

When such a method of determining the number of virtual reception antennas is applied to the antenna structure exemplified in FIG. 3b, since Nt=2 and Nr=5 in the antenna structure of FIG. 3b, Nv=(2−1)×(5−1)=4. That is, in FIG. 3b, four virtual reception antennas including A1', A2', A3', and A4' are substantially used in the signal processing process.

In the antenna structure of FIG. 3b, at the time of signal processing, the signal processing unit 140 applies a signal (reception signal), which is returned and received when a transmission signal transmitted from the transmission antenna a1 is reflected by an object, to the signal processing as being received through the five real reception antennas A1, A2, A3, A4, and A5, and applies a signal (reception signal), which is returned and received when a transmission signal transmitted from the transmission antenna a2 is reflected by the object, to the signal processing as being received by the four virtual reception antennas A1', A2', A3', and A4'. As will be described again below, signal processing means a phase difference compensation processing that compensates for a phase difference between all of the antennas (including all of the real reception antennas and the virtually formed reception antennas), and a signal synthesizing processing that synthesizes the signals of which the phase difference has been compensated for.

FIGS. 3a and 3b which have been referred to above for describing an antenna structure illustrate an antenna structure having a virtual aperture structure in a case where there are two transmission antennas and the five reception antennas.

FIGS. 4a and 4b illustrate, as another exemplary antenna structure, an antenna structure having a virtual aperture structure in a case where there are three transmission antennas and four reception antennas.

FIG. 4a illustrates an antenna structure in which virtual reception antennas A4' and A4" are formed outside the outermost real reception antenna A4 and FIG. 4b illustrates an antenna structure in which the virtual reception antennas A4' and A4" are not formed outside the outermost real reception antenna A4.

The antenna structures exemplified in FIGS. 4a and 4b corresponds to a case where the number of transmission antennas is three and the number of reception antennas is 4. That is, Nt=3, Nr=4.

Accordingly, when applying Equation 2, reception antenna interval Dr equals "3×Dt". That is, in the antenna structures exemplified in FIGS. 4a and 4b, four reception antennas A1, A2, A3, and A4 are disposed to be spaced apart from each other at an interval which is three times the spaced interval (transmission antenna interval) of the three transmission antennas a1, a2 and a3.

In the antenna structure illustrated in FIG. 4a, when calculating the number of virtual reception antennas virtually formed in the reception end by applying Equation 4, the number of virtual reception antennas equals to 8 (i.e., Nv=(3−1)×4=8).

In the antenna structure illustrated in FIG. 4a, among the eight virtual reception antennas, the virtual reception antennas A1' and A1" are formed between the reception antennas A1 and A2, the virtual reception antennas A2' and A2" are formed between the reception antennas A2 and A3, the virtual reception antennas A3' and A3" are formed between the reception antennas A3 and A4, and the virtual reception antennas A4' and A4" are formed outside of the reception antenna A4.

In the antenna structure of FIG. 4a, the reception antennas A1, A2, A3, and A4 are reception end antennas corresponding to the transmission antenna a1, the virtual reception antennas A1', A2', A3', and A4' are reception end antennas corresponding to the transmission antenna a2, and the virtual reception antennas A1", A2", A3", and A4" are reception end antennas corresponding to the transmission antenna a3.

Meanwhile, as in the antenna structure of FIG. 4b, when the virtual reception antennas A4' and A4" are not formed outside the outermost real reception antenna A4, the number of virtual reception antennas virtually formed on the reception end equals six when the virtual reception antenna is calculated by applying Equation 5 (i.e., Nv=(3−1)×(4−1)=6).

In the antenna structure exemplified in FIG. 4b, among the six virtual reception antennas, the virtual reception antennas A1' and A1" are formed between the reception antennas A1 and A2, the virtual reception antennas A2' and A2" are formed between the reception antennas A2 and A3, and the virtual reception antennas A3' and A3" are formed between the reception antennas A3 and A4.

In the antenna structure of FIG. 4b, the reception antennas A1, A2, A3, and A4 are reception end antennas corresponding to the transmission antenna a1, the virtual reception antennas A1', A2', and A3' are the reception end antennas corresponding to the transmission antenna a2, and the virtual reception antenna A1", A2", and A3" are the reception end antennas corresponding to the transmission antenna a3.

Meanwhile, the signal processing unit 140 included in the radar apparatus 100 illustrated in FIG. 1 may detect a distance to an object, a velocity of the object, and a bearing of the object based on a real reception signal received through the plurality of reception antennas and a virtual reception signal estimated to be virtually received through the plurality of virtual reception antennas.

Figure 5:
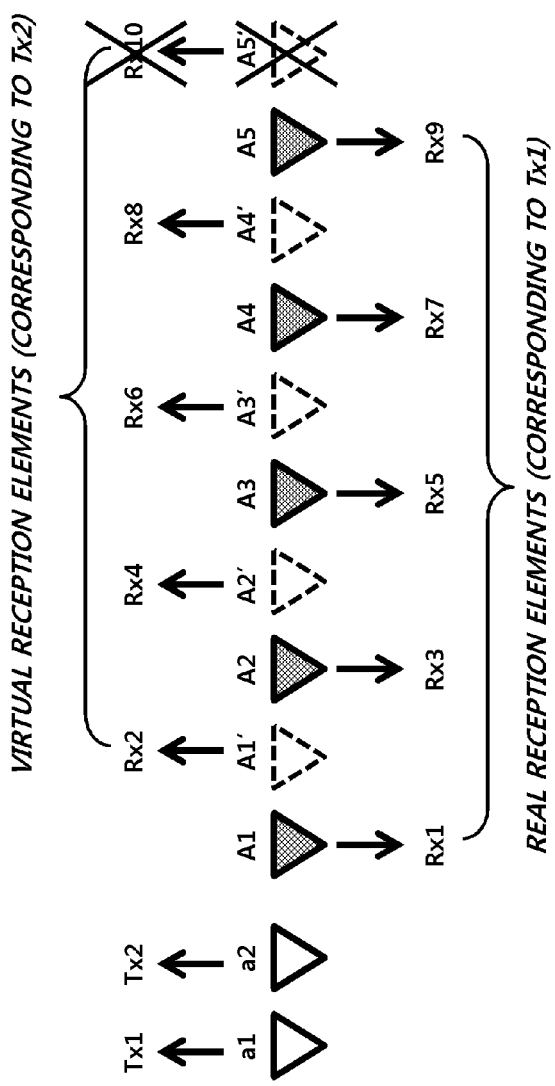
FIG. 5 and FIG. 6 are views for describing a signal processing method under the antenna structure of FIG. 3.

Referring to FIG. 5 which is a view for describing a signal processing method under the antenna structure of FIGS. 3a and 3b, after a transmission signal Tx1 is transmitted by a transmission antenna a1 and a transmission signal Tx2 is transmitted by a transmission antenna a2, five real reception antennas A1, A2, A3, A4, and A5 receive reception signals Rx1, Rx3, Rx5, Rx7, and Rx9, respectively.

Here, in connection with the formation of virtual reception antennas, assuming that a virtual reception antenna A5' is not formed outside the outermost reception antenna A5 with reference to the reception antenna A1 or not used even if it is formed, four virtual reception antennas A1', A2', A3', and A4' formed by the virtual reception antenna forming unit 130 are arranged as illustrated in FIG. 5.

At this time, the five reception antennas A1, A2, A3, A4, and A5 are real reception elements corresponding to the transmission signal Tx1 transmitted by the transmission antenna a1. In addition, the four virtual reception antennas A1', A2', A3', and A4' are virtual reception elements corresponding to the transmission signal Tx2 transmitted by the transmission antenna a2.

Under such an antenna structure, the signal processing unit 140 estimates virtual reception signals Rx2, Rx4, Rx6, and Rx8 which may be received by the four virtual reception antennas A1', A2', A3', and A4' based on the reception signals Rx1, Rx3, Rx5, Rx7, and Rx9 received by the five real reception antennas A1, A2, A3, A4, and A5, respectively.

As a result, the signal processing unit 140 may detect an object based on the real reception signals Rx1, Rx3, Rx5, Rx7, and Rx9 received through the five real reception antennas A1, A2, A3, A4, and A5 and the virtual reception signals Rx2, Rx4, Rx6, and Rx8 which are estimated to be received through the four virtual reception antennas A1', A2', A3', and A4'. Here, detecting the object means detecting a distance to the object, a velocity of the object and a bearing of the object.

At the time of detecting an object, the signal processing unit 140 may compensate for an inter-signal phase difference with reference to the real reception signals Rx1, Rx3, Rx5, Rx7, and Rx9 through the five real reception antennas A1, A2, A3, A4, A5 and the virtual reception signals Rx2, Rx4, Rx6, and Rx8 estimated to be received through the four virtual reception antennas A1', A2', A3', and A4', and may detect the object based on one synthesized signal obtain by synthesizing the reception signals of which the phase differences have been compensated for.

Here, an inter-signal phase difference (e.g., a phase difference between Rx1 and Rx2, a phase difference between Rx2 and Rx3, and so on) may occur due to a path difference between reception signals which is caused by a reception end antenna interval (Dr': an interval between A1 and A1', an interval between A1' and A2, and so on).

Meanwhile, upon using an antenna structure according to an exemplary embodiment of the present invention as described above, it is possible to design a reception arrangement structure which is impossible to physically implement.

As an example, a predetermined number of reception end antennas A1, A1', A2, A2', A3, A3', A4, A4', A5, and A5' may be tied so as to perform a signal processing for a reception signal. Such a structure in which a predetermined number of antennas is tied as described above is referred to as a "sub-antenna structure (or sub-array structure)".

Figure 6:
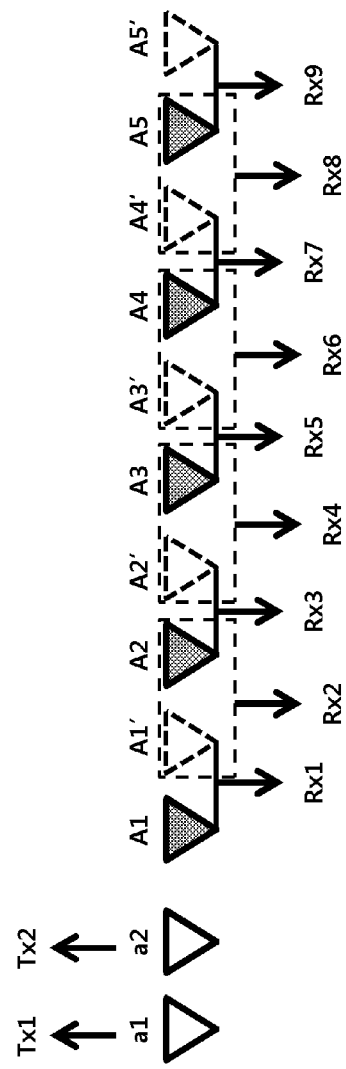

FIG. 6 exemplifies an antenna structure to which such a sub-antenna structure is applied. However, in connection with formation of virtual reception antennas, it is assumed that a virtual reception antenna A5' is not formed outside the outermost reception antenna A5 or not used even if the virtual reception antenna A5' is formed.

The antenna structure of FIG. 6 includes a sub-antenna structure in which A1 and A1' are tied together, a sub-antenna structure in which A1' and A2 are tied together, a sub-antenna structure in which A2 and A2' are tied together, a sub-antenna structure in which A2' and A3 are tied together, a sub-antenna structure in which A3 and A3' are tied together, a sub-antenna structure in which A3' and A4 are tied together, a sub-antenna structure in which A4 and A4' are tied together, a sub-antenna structure in which A4' and A5 are tied together, and a sub-antenna structure in which A5 and A5' are tied together.

Referring to FIG. 6, the signal processing unit 140 senses an object based on reception signals Rx1, Rx2, . . . , and Rx9 which are received through the above-described nine sub-antenna structures, respectively.

In connection with the signal processing method using the above-described sub-antenna structures, the signal processing unit 140 may recognize reception end antennas including a plurality of reception antennas and a plurality of virtual reception antennas as a plurality of reception antenna groups (sub-antenna structures) based on the arrangement positions of the plurality of reception antennas and the plurality of virtual reception antennas, and may detect a distance to an object, a velocity of the object, and a bearing of the object based on a reception signal received through each of the reception antenna groups.

Figure 7:
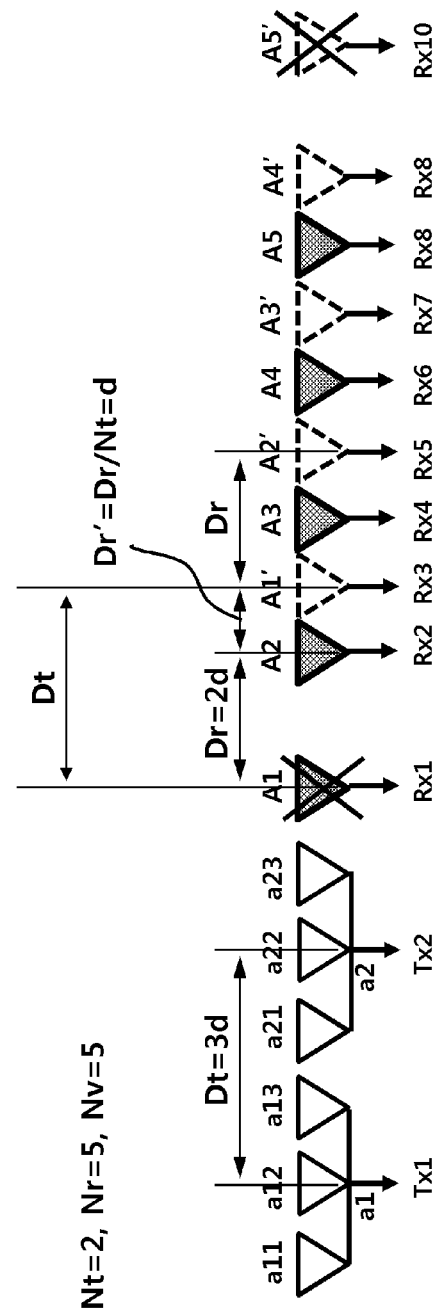
FIG. 7 is a view illustrating another example of an antenna structure.

FIG. 7 illustrates another example of an antenna structure.

FIG. 7 illustrates an antenna structure in which a reception antenna interval is determined according to a transmission antenna interval but does not satisfy a relation formula (Dr=Nt*Dt) such as Equation 1 (Equation 2).

Referring to FIG. 7, although six transmission antenna elements a11, a12, a13, a21, a22, and a23 in the transmission end, they act as two transmission antennas a1 and a2 by being tied up in bundles of three. Accordingly, the number of transmission antennas is two. In addition, it is assumed that the transmission antenna interval Dt for two practical transmission antennas a1 and a2 is, for example, three times a reference length d.

In addition, in the reception end, five real reception antennas A1, A2, A3, A4, and A5 exist, and the reception antenna interval Dr for the five real reception antennas A1, A2, A3, A4, and A5 is determined as twice the reference length d, for example.

That is, information related to the transmission end antenna structures and the reception end antenna structures is as follows.

1. Information related to the transmission end antenna structures: Nt=2, Dt=3d

2. Information related to the reception end antenna structures: Nr=5, Dr=2d

A reception antenna interval Dr is determined according to a transmission antenna interval. As another example, a reception antenna interval may not satisfy a relation formula of Equation 2 (Dr=Nt*Dt) and FIG. 7 is the case. In such a case, the reception antenna interval may be an interval which allows a position (i.e., position A1') spaced apart (shifted) by a transmission antenna interval Dt with reference to the arrangement position of the initially arranged reception antenna A1 to exist between two adjacent reception antennas (i.e., between A2 and A3).

Considering formation of virtual antennas, a plurality of virtual reception antennas A1', A2', A3', A4', and A5' are formed to be dispersed to the spaces between every two adjacent reception antennas in the reception antennas A1, A2, A3, A4, and A5, respectively, in which a plurality of virtual reception antennas A1', A2', A3', A4', and A5' are formed and arranged to be spaced apart, by a reception antenna interval Dr, from a position which is shifted by a transmission antenna interval Dt with reference to the position of the initially arranged reception antenna A1 among the reception antennas A1, A2, A3, A4, and A5.

When the virtual antennas are formed and arranged in this manner, the arrangement as illustrated in FIG. 7 is obtained. At this time, the interval between the reception antennas A1 and A2 and the interval between the virtual reception antennas A4' and A5' are different from the antenna interval Dr' in the remaining reception end.

In such a case, the reception antenna A1 and the virtual reception antenna A5' may not be used. That is, among a plurality of reception antennas actually existing on the reception end and a plurality of virtual reception antenna virtually formed on the reception end, a reception antenna and/or a virtual reception antenna positioned on both sides may not be used. That is, reception signals Rx1 and Rx10 are not used for signal processing and only the remaining reception signals may be used to perform the signal processing.

Figure 8:
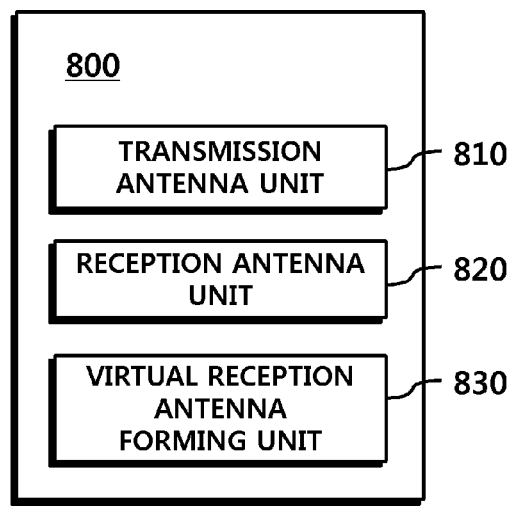
FIG. 8 is a block diagram illustrating an antenna apparatus according to an exemplary embodiment of the present invention.

FIG. 8 is a block diagram illustrating an antenna apparatus 800 according to an exemplary embodiment of the present invention.

Referring to FIG. 8, the antenna apparatus 800 according to the exemplary embodiment of the present invention includes, for signal transmission/reception, a transmission antenna unit 810 including a plurality of transmission antennas arranged at a predetermined transmission antenna interval, and a reception antenna unit 820 including a plurality of reception antennas arranged at a reception antenna interval which is determined depending on the transmission antenna interval.

In addition, the antenna apparatus 800 according to the exemplary embodiment of the present invention may further include a virtual reception antenna forming unit 830 configured to perform a control such that a plurality of virtual reception antennas is formed in an reception antenna according to an arrangement structure of the plurality of transmission antennas and the plurality of reception antenna.

In FIG. 8, the transmission antenna unit 810, the reception antenna unit 820, and the virtual reception antenna forming unit 830 may have the same configurations as the transmission unit 110, the reception unit 120, and the virtual reception antenna forming unit 130 of FIG. 1, respectively.

In addition, all the antenna structures described above with reference to FIGS. 1 to 7 may also be equally applied to the antenna apparatus 800 of FIG. 8.

All the antennas described herein such as transmission antennas and reception antennas may be array antennas.

An object of the radar apparatus 100 and the antenna apparatus 800 according to exemplary embodiments of the present invention is to enhance resolution. Here, the resolution is also referred to as discrimination or resolving power which means a performance of precisely discriminating two adjacent objects. This is one of very important performance factors of the radar apparatus 100 and the antenna apparatus 800.

In addition, another object of the radar apparatus 100 and the antenna apparatus 800 is to avoid a grating lobe, which is also one of very important performance factors of the radar apparatus 100 and the antenna apparatus 800.

Descriptions will be made on a principle for avoiding a grating lobe phenomenon. When a circle having a radius kd is projected to Ψ, a grating lobe phenomenon may occur if one or more peaks existing on a universal pattern belongs to this range. At this time, the grating lobe exists to have the same size as a main beam.

In order to avoid such a grating lobe, the following Equation 6 shall be satisfied.

$$2kd < 2\pi \Rightarrow d < \frac{1}{2}\lambda \qquad \text{Equation 6}$$

In Equation 6, kd refers to a projection (transmission) radius of a signal, d is an antenna interval, and λ is a wavelength of the signal.

According to Equation 6, in order to avoid the grating lobe, the antenna interval d should be smaller than a half wavelength λ/2 of the signal.

However, when the antenna interval d is too small, the resolution (resolving power) is lowered.

Accordingly, considering avoidance of a grating lobe and high resolution, the antenna interval d should be smaller than a half wavelength λ/2 of the signal and larger than a critical value (critical value of the antenna interval) which does not excessively degrade the resolution.

As described above, in order to meet with a condition of an antenna interval d for achieving avoidance of a grating lobe and high resolution, the radar apparatus 100 and the antenna apparatus 800 according to the exemplary embodiments of the present invention form virtual reception antennas at proper positions and at a proper interval such that a reception end antenna interval Dr' becomes larger than the critical value (the critical value of the antenna interval) which does not excessively degrade the resolution and smaller than a half wavelength λ/2 of a signal.

According to the present invention described above, it is possible to provide a radar apparatus and an antenna apparatus which include an antenna structure capable of suppressing a grating lobe while enhancing resolution.

What is claimed is:

1. A radar apparatus comprising:
  a transmission unit including a plurality of transmission antennas which are arranged at a predetermined transmission antenna interval, and configured to radiate a transmission signal using the plurality of transmission antennas;
  a reception unit including a plurality of reception antennas which are arranged at a predetermined reception antenna interval, and configured to receive a reception signal when the transmission signal is reflected by an object, through the plurality of reception antennas; and
  a signal processing unit configured to detect the object based on the reception signal received by the reception unit,
  wherein a plurality of virtual reception antennas are disposed according to an arrangement structure of the plurality of transmission antennas and the plurality of reception antennas so that at least two virtual reception antennas are disposed between every two adjacent reception antennas, wherein the reception antenna interval is equal to the transmission antenna interval multiplied by the number of transmission antennas, wherein the at least two virtual reception antennas are spaced apart from each other between every two adjacent reception antennas, and wherein an interval between reception end antennas including the plurality of reception antennas and the plurality of virtual reception antennas is determined based on the number of the transmission antennas and the reception antenna interval, so that the plurality of virtual reception antennas are dispersed in spaces between the reception antennas, wherein the interval between the reception end antennas is equal to the reception antenna interval divided by the number of the transmission antennas.

2. The radar apparatus of claim 1, wherein the signal processing unit is configured to detect a distance to the object, a velocity of the object, and a bearing of the object based on a real reception signal received through the plurality of reception antennas and a virtual reception signal estimated to be virtually received through the plurality of virtual reception antennas.

3. The radar apparatus of claim 2, wherein the signal processing unit is configured to compensate for a phase difference between signals with respect to the real reception signal received through the plurality of reception antennas and the virtual reception signal estimated to be virtually received through the plurality of virtual reception antennas, and to detect the distance to the object, the velocity of the object, and the bearing of the object based on one synthesized signal obtained by synthesizing the reception signals which are received and subjected to the compensation for phase difference.

4. The radar apparatus of claim 2, wherein the signal processing unit is configured to set reception end antennas including the plurality of reception antennas and the plurality of virtual reception antennas as a plurality of reception antenna groups, based on arrangement positions of the plurality of reception antennas and the plurality of virtual reception antennas, and to detect the distance to the object, the velocity of the object and the bearing of the object, based on a reception signal received through each of the reception antenna groups, and wherein each of the plurality of reception antenna groups includes at least one reception antenna and at least one virtual reception antenna.

5. An antenna apparatus for signal transmission/reception, comprising:

a transmission antenna unit including a plurality of transmission antennas arranged at a predetermined transmission antenna interval; and a reception antenna unit including a plurality of reception antennas arranged at a reception antenna interval which is determined on the transmission antenna interval, wherein a plurality of virtual reception antennas are disposed according to an arrangement structure of the plurality of transmission antennas and the plurality of reception antennas so that at least two virtual reception antennas are disposed between every two adjacent reception antennas, wherein the reception antenna interval is equal to the transmission antenna interval multiplied by the number of transmission antennas, wherein the at least two virtual reception antennas are spaced apart from each other between every two adjacent reception antennas, and wherein an interval between reception end antennas including the plurality of reception antennas and the plurality of virtual reception antennas is determined based on the number of the transmission antennas and the reception antenna interval, so that the plurality of virtual reception antennas are dispersed in spaces between the reception antennas, wherein the interval between the reception end antennas is equal to the reception antenna interval divided by the number of the transmission antennas.

* * * * *